(12) United States Patent
Cantwell et al.

(10) Patent No.: US 10,628,443 B2
(45) Date of Patent: Apr. 21, 2020

(54) DATA SYNCING IN A DISTRIBUTED SYSTEM

(71) Applicant: NetApp, Inc., Sunnyvale, CA (US)

(72) Inventors: Jared Cantwell, Boulder, CO (US); William Minckler, Broomfield, CO (US); Joe Roback, Fort Collins, CO (US); James Philip Wittig, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 567 days.

(21) Appl. No.: 14/684,929

(22) Filed: Apr. 13, 2015

(65) Prior Publication Data

US 2015/0242478 A1 Aug. 27, 2015

Related U.S. Application Data

(63) Continuation of application No. 14/186,847, filed on Feb. 21, 2014.

(51) Int. Cl.
*G06F 16/27* (2019.01)
*H04L 29/08* (2006.01)

(52) U.S. Cl.
CPC .......... *G06F 16/27* (2019.01); *H04L 67/1095* (2013.01)

(58) Field of Classification Search
CPC .... G06F 3/067; G06F 3/061; G06F 17/30212; G06F 16/27; H04L 67/1097; H04L 67/1095
See application file for complete search history.

(56) References Cited

U.S. PATENT DOCUMENTS

| 6,604,155 B1 | 8/2003 | Chong, Jr. |
| 6,779,003 B1 * | 8/2004 | Midgley ............. G06F 11/2071 |
| 7,188,149 B2 * | 3/2007 | Kishimoto ............. H04L 29/06 709/217 |

(Continued)

OTHER PUBLICATIONS

International Search Report and the Written Opinion of the International Searching Authority received for PCT Application No. PCT/US15/16625 dated Sep. 17, 2015, 8 pages.

(Continued)

*Primary Examiner* — Patrice L Winder
*Assistant Examiner* — Angela M Widhalm De Rodrig
(74) *Attorney, Agent, or Firm* — Cesari and McKenna, LLP

(57) ABSTRACT

Disclosed are systems, computer-readable mediums, and methods for receiving a start replication message to replicate a source volume to a replicated volume. A source system forwards I/O requests to the replica server. A data structure associated with the replicated volume is initialized. A write request is received from the source system. The write data is written to the replicated volume and the data structure is updated. Source metadata associated with the source volume is received. The source metadata is compared with prior metadata associated with a prior point-in-time image of the source volume to determine blocks of data that have changed since the prior point-in-time image of the source volume. A first block is determined to not be retrieved based upon the data structure. A second block is determined to be retrieved based upon the data structure. The second block is received and written to the replicated volume.

17 Claims, 6 Drawing Sheets

(56) References Cited

U.S. PATENT DOCUMENTS

| | | | |
|---|---|---|---|
| 7,543,100 B2* | 6/2009 | Singhal | G06F 11/1076 709/211 |
| 7,657,578 B1 | 2/2010 | Karr et al. | |
| 8,055,745 B2* | 11/2011 | Atluri | G06F 11/1453 709/217 |
| 8,468,180 B1 | 6/2013 | Meiri et al. | |
| 8,671,265 B2* | 3/2014 | Wright | G06F 15/173 711/1 |
| 9,092,142 B2* | 7/2015 | Nashimoto | G06F 3/061 |
| 2003/0028642 A1 | 2/2003 | Agarwal et al. | |
| 2003/0135609 A1 | 7/2003 | Carlson et al. | |
| 2004/0107281 A1 | 6/2004 | Bose et al. | |
| 2005/0027817 A1* | 2/2005 | Novik | G06F 17/30581 709/217 |
| 2007/0083482 A1* | 4/2007 | Rathi | G06F 3/048 |
| 2007/0088702 A1* | 4/2007 | Fridella | G06F 17/30123 |
| 2007/0186066 A1* | 8/2007 | Desai | G06F 11/1448 711/162 |
| 2007/0186127 A1* | 8/2007 | Desai | G06F 11/1448 714/13 |
| 2007/0208918 A1* | 9/2007 | Harbin | G06F 11/1451 711/162 |
| 2009/0157870 A1* | 6/2009 | Nakadai | G06F 9/505 709/224 |
| 2009/0271412 A1* | 10/2009 | Lacapra | G06F 17/30206 |
| 2011/0238857 A1 | 9/2011 | Certain et al. | |
| 2012/0003940 A1* | 1/2012 | Hirano | H04W 74/0816 455/67.13 |
| 2012/0078856 A1* | 3/2012 | Linde | G06F 11/1466 707/679 |
| 2012/0124282 A1 | 5/2012 | Frank et al. | |
| 2012/0317353 A1* | 12/2012 | Webman | G06F 3/065 711/108 |
| 2012/0317395 A1 | 12/2012 | Segev et al. | |
| 2013/0007097 A1* | 1/2013 | Sambe | G06F 3/0604 709/203 |
| 2013/0073519 A1* | 3/2013 | Lewis | G06F 17/30215 707/610 |
| 2013/0124776 A1 | 5/2013 | Hallak et al. | |
| 2013/0138616 A1* | 5/2013 | Gupta | G06F 17/30174 707/690 |
| 2013/0173955 A1 | 7/2013 | Hallak et al. | |
| 2013/0185719 A1* | 7/2013 | Kar | G06F 9/45558 718/1 |
| 2013/0227111 A1 | 8/2013 | Wright et al. | |
| 2013/0232261 A1* | 9/2013 | Wright | H04L 41/50 709/224 |
| 2013/0305002 A1 | 11/2013 | Hallak et al. | |
| 2014/0006353 A1* | 1/2014 | Chen | G06F 17/30227 707/648 |
| 2014/0082273 A1 | 3/2014 | Segev | |
| 2014/0108350 A1* | 4/2014 | Marsden | H04L 69/40 707/639 |
| 2014/0310231 A1* | 10/2014 | Sampathkumaran | G06F 17/30563 707/602 |
| 2014/0344222 A1* | 11/2014 | Morris | G06F 17/30215 707/634 |
| 2015/0066852 A1* | 3/2015 | Beard | G06F 17/30212 707/625 |

OTHER PUBLICATIONS

Non-Final Office Action received for U.S. Appl. No. 14/186,847 dated Aug. 13, 2015, 23 pages.

Final Office Action on U.S. Appl. No. 14/186,847 dated Feb. 16, 2016.

* cited by examiner

DATA SYNCING IN A DISTRIBUTED SYSTEM

CROSS-REFERENCE TO RELATED APPLICATIONS

The present application is a continuation of U.S. patent application Ser. No. 14/186,847, filed Feb. 21, 2014, the entire contents of which are incorporated herein by reference in its entirety.

BACKGROUND

The following description is provided to assist the understanding of the reader. None of the information provided is admitted to be prior art.

In data storage architectures, a client's data may be stored in a volume. A unit of data, for example a file (or object), is comprised of one or more storage units (e.g. bytes) and can be stored and retrieved from a storage medium such as disk or RAM in a variety of fashions. For example, disk drives in storage systems are divided into logical blocks that are addressed using logical block addresses (LBAs). As another example, an entire file can be stored in a contiguous range of addresses on the storage medium and be accessed given the offset and length of the file. Most modern file systems store files by dividing them into blocks or extents of a fixed size, storing each block in a contiguous section of the storage medium, and then maintaining a list or tree of the blocks that correspond to each file. Some storage systems, such as write-anywhere file layout (WAFL), logical volume manager (LVM), or new technology file system (NTFS), allow multiple objects to refer to the same blocks, typically through a tree structure, to allow for efficient storage of previous versions or "snapshots" of the file system. In some cases, data for a single file or object may be distributed between multiple storage devices, either by a mechanism like RAID which combines several smaller storage media into one larger virtual device, or through a distributed storage system such as Lustre, General Parallel File System, or GlusterFS.

At some point, it is desirable to backup data of the storage system. Traditional backup methods typically utilize backup software that operates independently of the data storage system and manages the backup process. Backup methods exist to backup only the differences since the last full backup (e.g., a differential backup) or to backup only the changes since the last backup (e.g., an incremental backup). However, due to inefficiency of backup software, many administrators are shifting away from traditional backup processes and moving towards data replication methods. With replication comes the issue of replicating a mistake, for example, a wrongly deleted file. High bandwidth is required for both replication and backup solutions, and neither methods are particularly well suited to scale efficiently for long term archiving.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION OF EXAMPLE EMBODIMENTS

Overview

In general, one innovative aspect of the subject matter described below can be embodied in methods for receiving a start replication message from a source system to replicate data of a source volume to a replicated volume on a replica server. The replicated volume comprises a copy of data of the source volume. The source system forwards input/output (I/O) requests to the replica server after the start replication message is sent. A data structure associated with units of data of the replicated volume is initialized. A write request is received from the source system that includes write data associated a unit of data of the replicated volume. The source system wrote the write data to the source volume based upon the write request. The write data is written to the replicated volume. The data structure is updated to indicate the write data has been written after the receipt of the start replication message. Source metadata associated with the source volume is received. The metadata includes an ordered list of block identifiers for data blocks of the source volume. Each block identifier is used to access a data block. The source metadata is compared with prior metadata associated with a prior point-in-time image of the source volume to determine blocks of data that have changed since the prior point-in-time image of the source volume. A first block of the blocks of data is determined to not be retrieved based upon the data structure. A second block of the blocks of data is determined to be retrieved based upon the data structure. The second block is received from the source system and written to the replicated volume. Other embodiments of this aspect include corresponding systems, apparatuses, and computer-readable media, configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

DETAILED DESCRIPTION

Described herein are techniques for an incremental block level backup system. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

Figure 1:
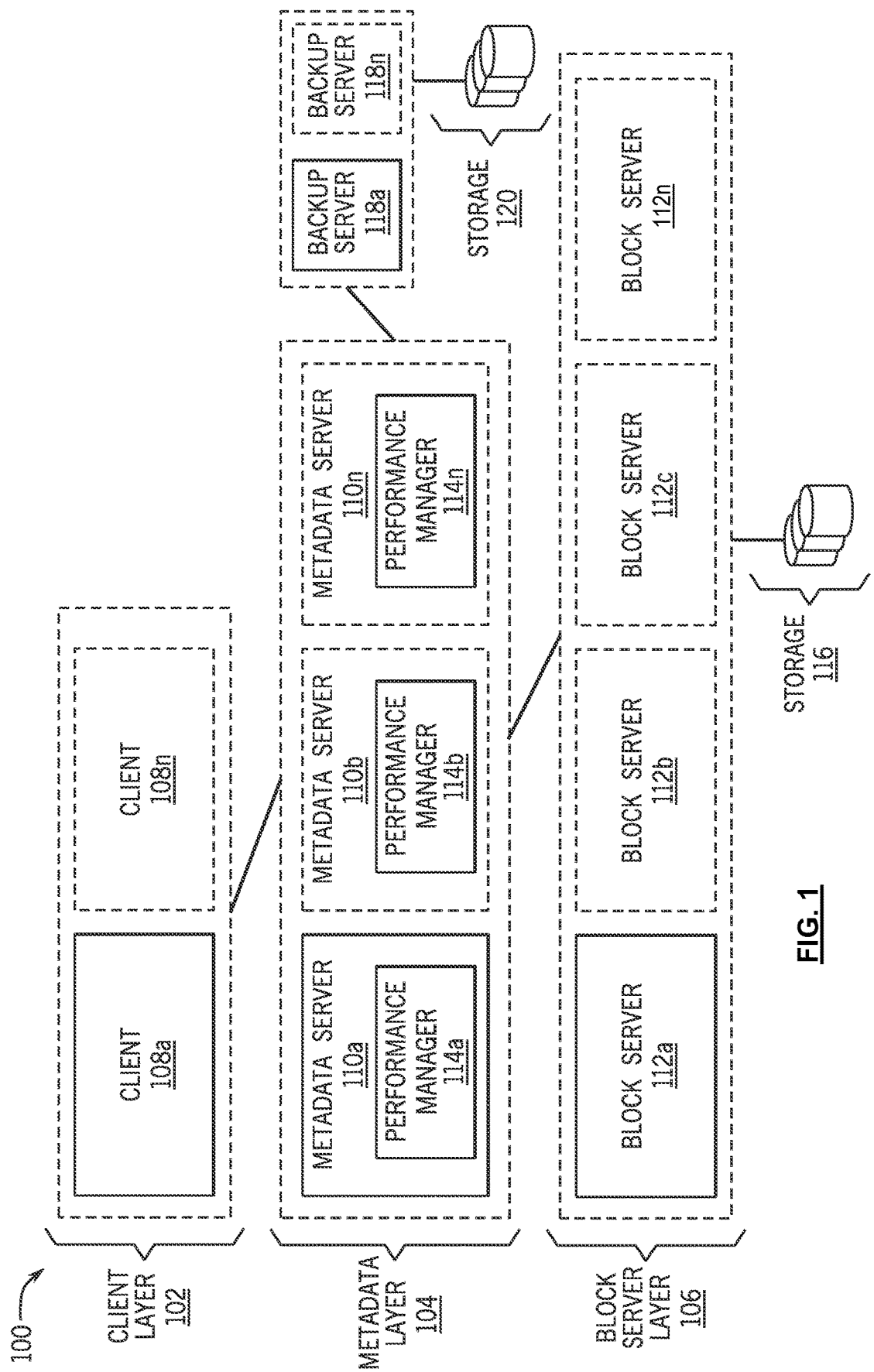
FIG. 1 depicts a simplified system for a storage system in accordance with an illustrative implementation.

FIG. 1 depicts a simplified system for incremental block level backup of a storage system 100 in accordance with an illustrative implementation. System 100 includes a client layer 102, a metadata layer 104, a block server layer 106, storage 116, and storage 120.

In general, client layer 102 includes one or more clients 108a-108n. Clients 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol.

Metadata layer 104 includes one or more metadata servers 110a-110n. Performance managers 114 may be located on metadata servers 110a-110n. Block server layer 106 includes one or more block servers 112a-112n. Block servers 112a-112n are coupled to storage 116, which stores volume data for clients 108. Each client 108 may be associated with a volume. In one implementation, only one client 108 accesses data in a volume; however, multiple clients 108 may access data in a single volume.

Storage 116 can include multiple solid state drives (SSDs). In one implementation, storage 116 can be a cluster of individual drives coupled together via a network. When the term "cluster" is used, it will be recognized that cluster may represent a storage system that includes multiple disks that may not be networked together. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 116 is based upon breaking data up into one or more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 and slice servers maintain a mapping between a block identifier and the location of the data block in a storage medium of block server 112. A volume includes these unique and uniformly random identifiers, and so a volume's data is also evenly distributed throughout the cluster.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 110 may be combined with one or more block servers 112 or backup servers 118 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Block Level Incremental Backup

One or more backup servers 118*a*-118*n* can interface with the metadata layer 104. Backup servers 118 can interface directly with block servers 112. Backup servers 118*a*-118*n* are coupled to storage 120, which stores backups of volume data for clients 108. Storage 120 can include multiple hard disk drives (HDDs), solid state drives (SSDs), hybrid drives, or other storage drives. In one implementation, storage 120 can be a cluster of individual drives coupled together via a network. Backup servers 118 can store backup copies of the data blocks of storage 116 according to any number of formats in storage 120, and translation from the format of the data blocks of storage 116 may occur. Data may be transferred to and from backup servers 118 using different protocols, such as small computer system interface (SCSI), Internet small computer system interface (ISCSI), fibre channel (FC), common Internet file system (CIFS), network file system (NFS), hypertext transfer protocol (HTTP), hypertext transfer protocol secure (HTTPS), web-based distributed authoring and versioning (WebDAV), or a custom protocol. Compression and data de-duplication may occur in backup servers 118*a*-118*n*.

As discussed above, the servers of metadata layer 104 store and maintain metadata that maps between client layer 102 and block server layer 106, where the metadata maps between the client addressing used by clients 108 (e.g., file names, volume, object names, block numbers, etc.) and block layer addressing (e.g., block identifiers) used in block server layer 106. In one embodiment, the metadata includes a list of block identifiers that identifies blocks in a volume. The list may be structured as an ordered list corresponding to a list of blocks. The list may also be structured as the leaves of a hash tree. The block identifiers of the metadata are the same block identifiers as used throughout system 100 as described above. The block identifiers may be hexadecimal numbers, but other representations may be used. Additional metadata may also be included, such as inode numbers, directory pointers, modification dates, file size, client addresses, list details, etc. The block identifiers uniquely identify the data of a block and are a hash based on the content of the data block. Backup servers 118 are generally configured to create backups of block level data of a volume that is stored in storage 116 of block server layer 106. Backup servers 118 may create backups of all of the volume data of block server layer 106 or backup servers 118 may create backups of one or more particular volumes (e.g., a volume of a client 108). Backups may be full backups of all data, or they may be incremental backups (e.g., data that has changed since a previous backup).

During an initial backup operation, a backup server 118 retrieves a copy of metadata from metadata server 110 for a client volume. The metadata includes a list of block identifiers associated with data blocks of the volume. In an implementation, the metadata includes an ordered list structure of block identifiers. In another implementation, the ordered list is structured as the leaves of a hash tree (e.g., a Merkle tree, etc.) and the metadata includes the hash tree. The metadata is used by backup server 118 to retrieve a copy of all of the data blocks of the client volume in order to create an initial backup of the data blocks. The data blocks are retrieved from storage 116 by sending a request for the data to a metadata server 110. The requested data is based on the data block identifiers. A request may include a list of the block identifiers of blocks desired to be backed up. In one implementation, backup server 118 may calculate the LBAs of blocks desired to be backed up. For example, because each block identifier can represent a known amount of data (e.g., a 4 k block, etc.), an LBA of a block can be calculated based on the location of the block identifier in the ordered list of block identifiers associated with the volume. For example, the position of a block identifier in the ordered list can be used along with the block size to determine the LBA of the data block. As described below, the tree structure can also be used to determine the data blocks that have changed after a previous backup. In this example, the number of leaf nodes to the left of a changed leaf node can be used to calculate the LBA of the data block. In implementations where LBAs are calculated, a request from backup server 118 may include a list of LBAs of blocks to be backed up. The metadata server 110 routes the request to a block server 112, which provides the requested data to metadata server 110. Metadata server 110 then routes the requested data to the backup server 118. This arrangement allows the servers of metadata layer 104 to facilitate data transmission between block server layer 106 and the backup servers 118. In another implementation, backup servers 118 may be configured to communicate directly with servers of block server layer 106. Upon retrieval of the requested data, the backup server 118 stores the data in storage 120. The data may be stored in storage 120 according to any of the methods discussed herein. Backup server 118 may create and maintain statistics and snapshot data corresponding to a particular backup operation. The snapshot data may be used later during a data restoration operation, or during a future backup operation. Backup server 118 can also store a copy of the metadata used during a particular backup operation. In another embodiment, the metadata is not stored on the backup server 118. Rather, the metadata is stored on another storage device, for example, one or more metadata servers, one or more block servers, or one or more devices remote from the backup system. As a result of the initial backup operation, a complete backup of the data of a client volume is created and stored in storage 120.

During an incremental backup operation, a backup server 118 retrieves the current metadata from metadata server 110 for a client volume. The backup server 118 can then compare the current metadata from metadata server 110 with a version of stored metadata on backup server 118 (e.g., the version of metadata stored during the most recent backup operation, or the initial version of the metadata stored during the initial backup, etc.). In an implementation where the metadata includes an ordered list of block identifiers, the backup server 118 can compare the block identifiers of the two versions of metadata node-by-node. For example, the current list node corresponding to a first block of data is compared to the stored list node corresponding to the first block of data, and each node of the ordered list is traversed and compared. Since the block identifiers are hashes based on content of a corresponding data block, a difference in hash values for corresponding nodes indicates that the data of the block has been changed/updated since the prior backup. As the block identifiers are integral to storage system 100 and maintained as described herein, the block identifiers can be compared in their native format and immediately used without the need to compute the hash values. In an implementation where the metadata includes a hash tree and the ordered list of block identifiers are structured as the leaves of the hash tree, additional performance gains may be realized. Such a hash tree is generally a tree data structure in which every non-leaf node includes the hash of its children nodes. This structure is particularly useful because it allows efficient determination of which data blocks have been updated since a prior backup, without the need to compare every node of the list of block identifiers. The determination of changed data blocks by using a hash tree will be discussed in further detail below with reference to FIGS. 2a-b. Upon determination of which particular blocks of data have changed since the previous backup, backup server 118 can retrieve the updated blocks of data from storage 116 by sending a request for the changed data block to the metadata server 110. As discussed above, the metadata server 110 can facilitate the transfer of data from the block server layer 106. Upon retrieval of the requested changed data blocks, the backup server 118 stores the data in storage 120. The backup server 118 also stores the current metadata from metadata server 110 used in the incremental backup operation. As a result of the incremental backup operation, only the data of a volume that has changed since a previous backup operation is backed up again. This provides a number of advantages, including increasing the efficiency of the data backup procedure, and decreasing the overall amount of data being transferred during the backup procedure. Further, any number of incremental backup operations may be performed, during which the current metadata from metadata server 110 may be compared to previously stored metadata on backup server 118 (e.g., the stored metadata from a prior backup operation).

Backup servers 118 may also provide an application programming interface (API) in order to allow clients 108 or traditional data backup software to interface with the backup systems described herein. For example, the API may allow backup servers 118 to send statistics related to backed up data and backup operations to and from clients 108 or traditional backup software. As another example, the API may allow backup servers 118 to receive a request to initiate a backup operation. The API can also allow for backup operations to be scheduled as desired by clients 108 or as controlled by data backup software. Other API functionality is also envisioned.

Figure 2A:
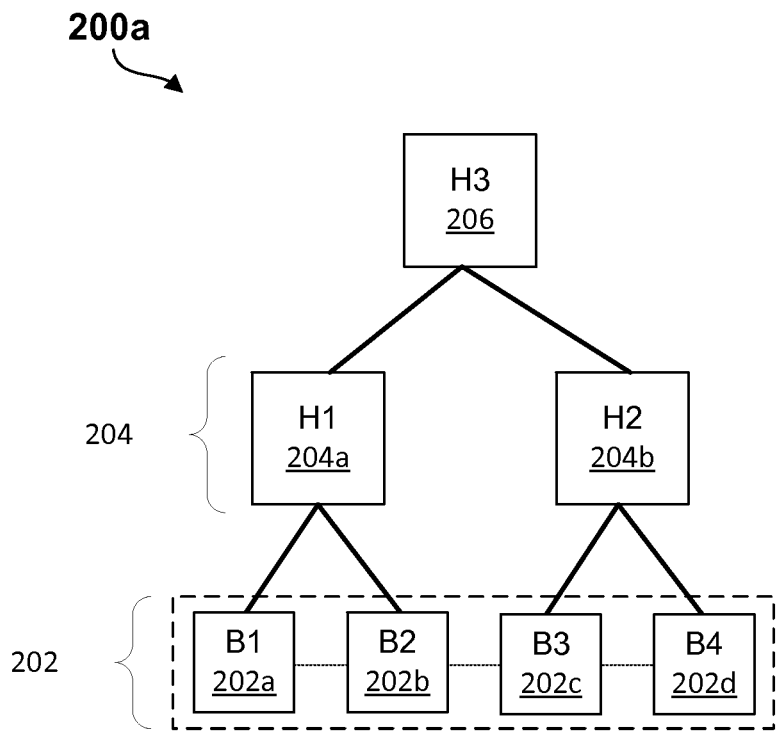
FIG. 2A depicts a hash tree in accordance with an illustrative implementation.

Referring to FIG. 2A, a hash tree 200a is shown in accordance with an illustrative implementation. The hash tree 200a may be a hash tree that is provided by a metadata server 110 to a backup server 118 in an initial or incremental backup operation as discussed above. Although depicted as a binary hash tree, hash tree 200a (and hash trees described herein) may have any number of child nodes/branches. Hash tree 200a represents the data of a particular volume, and can be provided along with additional metadata describing details related to the tree structure. For example, the metadata may include statistics regarding node counts, leaf-node counts, tree-depth, indexes to sub-trees, etc. Backup server 118 may store the additional metadata for future use. Hash tree 200a includes leaves 202a-d, internal nodes 204a-b, and root node 206. Leaves 202a-d store block identifies B1-B4, respectively. In an implementation, leaves 202a-d may be structured as an ordered list that is indexed by its parent nodes, which in this example are internal nodes 204. Block identifiers B1-B4 are identifiers as described herein (e.g., a hash of the corresponding data block's content), and each uniquely identify a particular data block of the volume. Hash tree 200a further includes non-leaf internal nodes 204a-b and non-leaf root node 206. The value stored by each non-leaf node is the hash of that node's children values. For example, hash H1 is the hash of block identifiers B1 and B2, hash H2 is the hash of block identifiers B3 and B4, and hash H3 is the hash of hashes H1 and H2. During an initial backup operation, backup server 118 can walk the tree, or traverse the ordered list of leaves 202a-d to determine that the data blocks corresponding to block identifiers B1-B4 should be retrieved to be backed up. A copy of hash tree 200a (and any accompanying metadata) is stored by backup server 118 when a backup operation is performed.

Figure 2B:
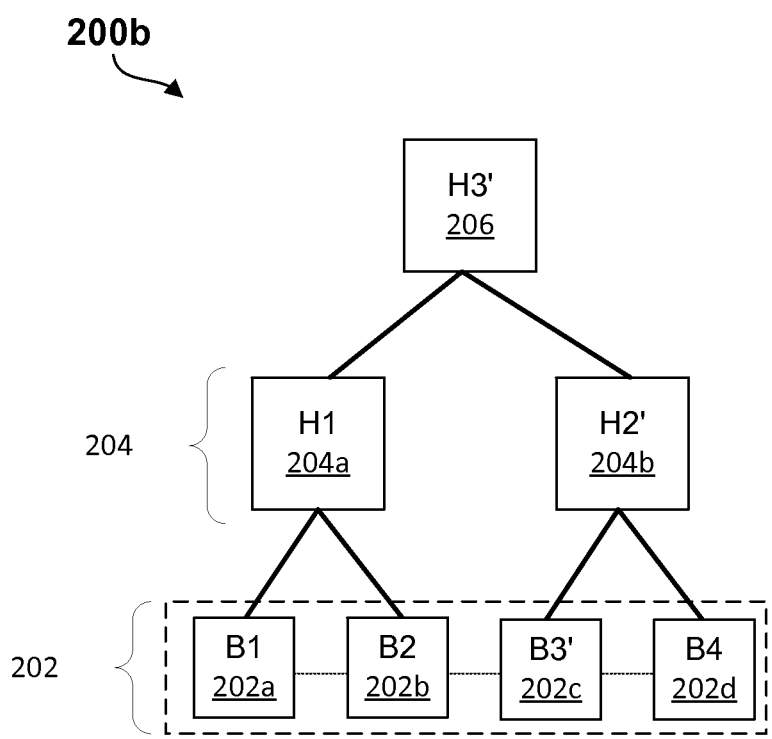
FIG. 2B depicts the hash tree illustrated in FIG. 2A, with updated node hashes, in accordance with an illustrative implementation.

Referring to FIG. 2B, the hash tree 200a of FIG. 2A is shown at a later time instance, as hash tree 200b. For example, hash tree 200a may have been provided by metadata server 110 during an initial backup operation and stored by the backup server 118, and hash tree 200b may have been provided by metadata server 110 during a subsequent incremental backup operation. Both hash trees 200a-b represent the data stored on a particular volume. As depicted, the block identifier B3 of leaf node 202c has changed to become block identifier B3' at some time since the previous backup. For example, new or updated data may have been written to the block referenced by block identifier B3. Because of the structure of the hash tree, the change of block identifier from B3 to B3' causes updates in hashes to propagate upward through the parent node to the root node. Specifically, hash H2 is recalculated to become H2', and hash H3 is recalculated to become to H3'. During a backup operation, backup server 118 may walk the hash tree 200b, and compare the nodes of hash tree 200b to corresponding nodes of hash tree 200a. A difference between corresponding non-leaf node hashes indicates that a block identifier (and therefore block data) below that non-leaf node has changed. If the hashes of corresponding non-leaf nodes are equal, this indicates that the block identifiers below that non-leaf node have not changed (and therefore corresponding block data has also not changed). Thus, the subtree of nodes below an unchanged non-leaf node can be skipped from further processing. In this manner, a performance increase may be realized as the entire hash tree does not need to be traversed in every backup operation. As an example with reference to FIG. 2B, backup server 118 may compare hash tree 200b to hash tree 200a as follows (although analysis performed by backup server 118 is not limited to the following operations or order of operations):

1. Node 206 is analyzed to determine that hash H3' is different from its previous value of H3, and therefore hash trees 200a-b need to be further analyzed.
2. Node 204a is analyzed to determine that hash H1 has not changed, and the subtree of node 204a (leaf nodes 202a-b) may be skipped from further analysis.
3. Node 204b is analyzed to determine that hash H2' is different from its previous value of H2, therefore the subtree of node 204b (leaf nodes 202c-d) must be analyzed.
4. Leaf node 202c is analyzed to determine that block identifier B3' is different from its previous value of B3. Thus, the data block corresponding to block identifier B3' needs to be backed up by backup server 118, since its data as changed since the previous backup operation.
5. Leaf node 202d is analyzed to determine that block identifier B4 has not changed, and traversal of hash trees 200a-b is complete.

After performing the above sample analysis, backup server 118 may proceed to retrieve the data based on the block identifier(s) that indicate data has changed, and has not yet been backed up. In this example, backup server 118 may send a request to a metadata server 110 for the data block identified by block identifier B3'. Upon receipt of the data block, backup server 118 stores the data block as a backup, and stores hash tree 200b (along with any accompanying metadata) for use in future backup and/or restoration operations.

In one implementation using trees, backup server 118 may retrieve the metadata from a metadata server 110 by requesting only child nodes whose parent node has changed. For example, starting with the root, if the root node has changed the children of the root node can then be requested. These nodes can then be compared to corresponding nodes in the previously stored tree to determine if those have changed. Children of any node that has changed can then be retrieved. This process can be repeated until leaf nodes are retrieved. For example, with reference to FIGS. 2A-B hash tree 200b may be the current metadata from metadata server 110, and hash tree 200a may be stored metadata from a previous backup operation. Backup server 118 may first retrieve root node 206 and analyze it to determine that hash H3' is different from its previous value of H3. In response, backup server 118 may then request nodes 204a-b from interior node level 204. Node 204a is analyzed to determine that hash H1 has not changed, and leaf nodes 202a-b may be skipped from further requests/analysis. Node 204b is analyzed to determine that hash H2' is different from its previous value of H2, and thus backup server 118 may proceed to request appropriate nodes of leaf level 202 (leaves 202c-d). Analysis may then continue as described above to determine that block identifier B3' is different from its previous value of B3 and that the data block corresponding to block identifier B3' needs to be backed up. This implementation may allow for performance increases by minimizing data that is transmitted between backup server 118 and metadata server 110 during the retrieval of metadata.

At some point, it may be desirable by clients 108 or an administrator of system 100 to increase the volume size assigned to a client 108 by adding more data blocks of storage space. In this situation, with backup servers 118 implementations configured to utilize metadata of an ordered list of block identifiers, any newly added block identifiers (corresponding to the new data blocks) may be appended to the end of the ordered list. Thus, during a backup operation, if a backup server 118 receives metadata of an ordered list that has more elements than that of metadata from a prior backup operation, backup server 118 can determine the newly added data blocks that must be backed up based on the additional list elements. The backup operation may proceed as described above with respect to the remaining elements.

Figure 2C:
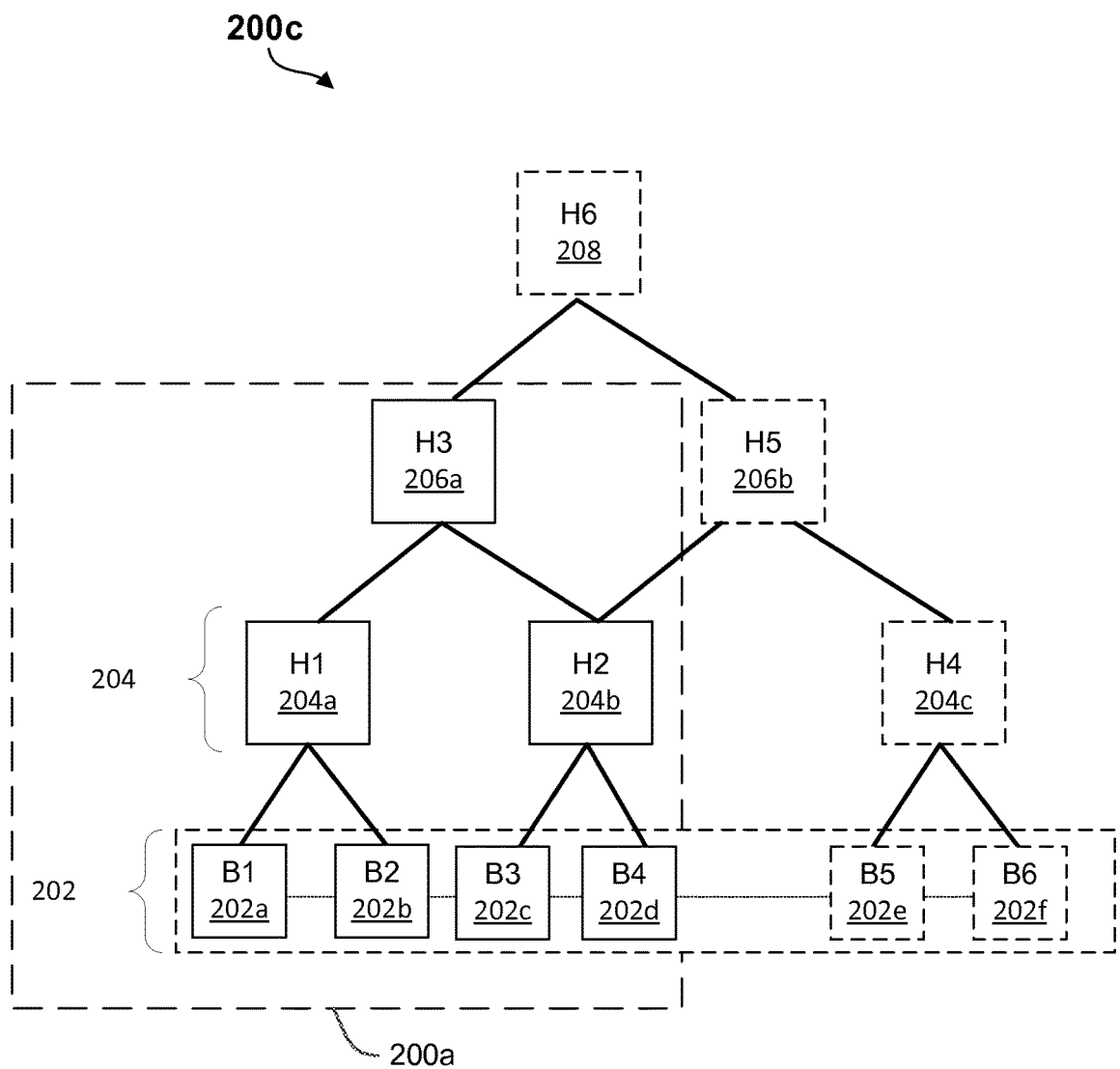
FIG. 2C depicts the hash tree illustrated in FIG. 2A, with newly added leaves, in accordance with an illustrative implementation.

FIG. 2C depicts the result of an increased volume size for implementations configured to utilize metadata of a hash tree. Hash tree 200c is based on hash tree 200a (which is included as a subtree and is denoted by a dashed box). Leaves 202e-f have been newly added to the hash tree and include block identifiers B5-B6, which correspond to the newly added data blocks of the increased volume size. As a result of the volume increase, hash tree 200a is restructured such that root node 206 becomes internal node 206a, and a new root node 208 is created. Further, internal nodes 206b and 204c are added to maintain the tree structure. Hashes H4-H6 are calculated based on the respective child values as described above. After such a restructuring of a hash tree, a backup operation may proceed as described above. However, backup server 118 can determine the newly added data blocks that must be backed up based on a new root node or additional leaves. Also, an implementation may make use of additional metadata that includes the indexes of the root nodes of previously stored trees. In this manner, backup server 118 may access the indexes to locate and compare the root node of a prior tree with the corresponding internal node of the current tree (e.g., root node 206 can be compared to internal node 206a). If the comparison indicates that the hashes have not changed, then backup server 118 may skip analyzing the subtree of the internal node, and a performance gain may be realized.

At some point, it may be desirable by clients 108 or an administrator of system 100 to reduce the volume size assigned to a client 108 by removing data blocks of storage space. In this situation, with backup server 118 implementations configured to utilize metadata of an ordered list of block identifiers, any removed block identifiers (corresponding to removed data blocks) may be removed from the end of the ordered list. Thus, during a backup operation, if a backup server 118 receives metadata of an ordered list that has fewer elements than that of metadata from a prior backup operation, backup server 118 can determine the backed up data blocks that may be removed based on the additional list elements in the stored list from the prior backup. The backup operation may proceed as described above with respect to the remaining elements. With backup server 118 implementations configured to utilize metadata of a hash tree including leaves that are a list of block identifiers, the backup server 118 may compare the trees (e.g. depth of the trees, leaf node count, etc.) to determine that there has been a change in volume size. In another implementation the size of the volume can be part of the metadata received by the backup servers, and this metadata can be compared to a previously received volume size to determine that a change in volume has occurred. The backup server may then determine the position of the current tree within the stored hash tree. After locating the position of the current root node, the leaf nodes (and corresponding parent nodes) that are not within the subtree of the current root node can be ignored. Once the corresponding root nodes have been determined, the backup operation may then proceed as described above with respect to the remaining nodes.

Figure 3:
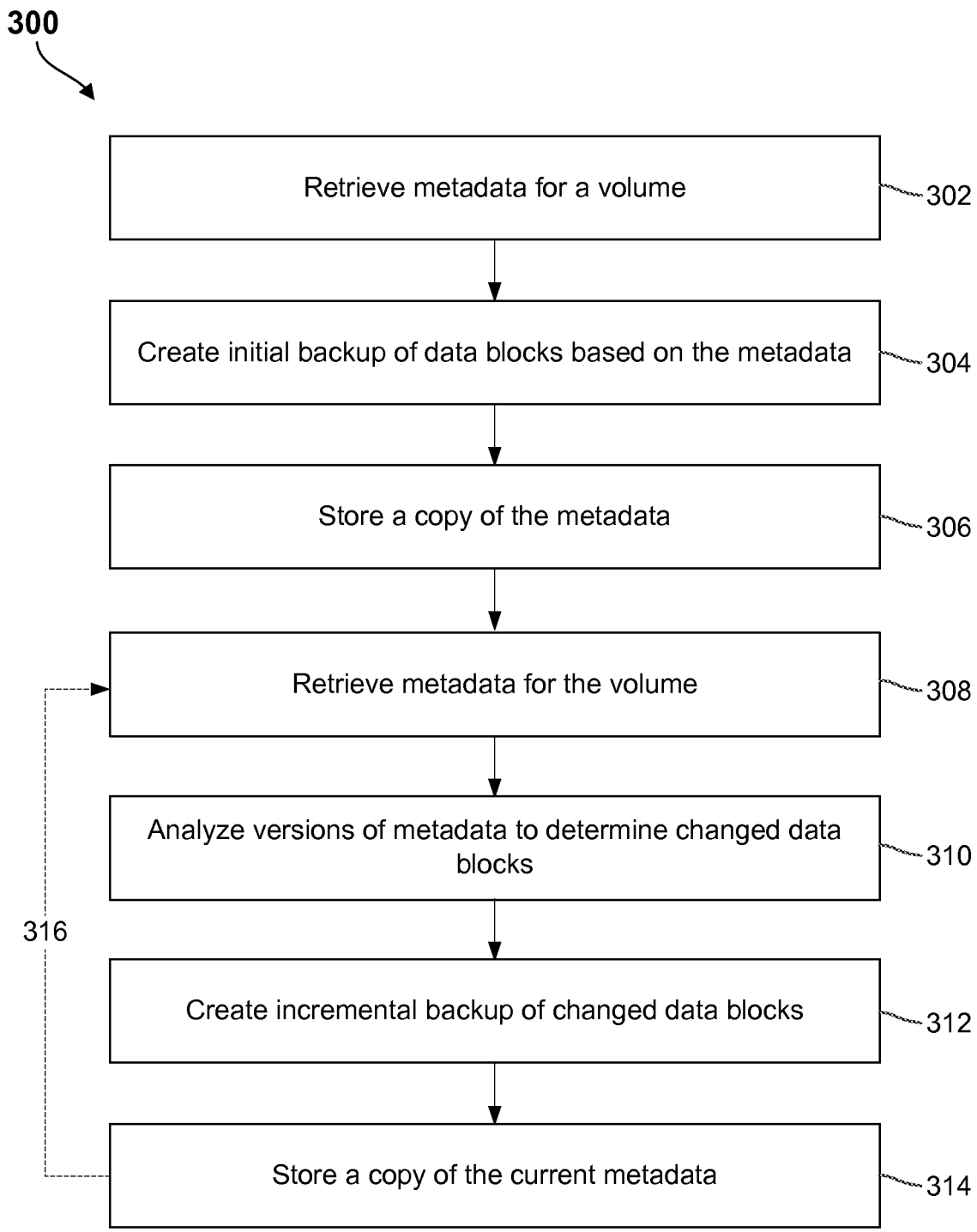
FIG. 3 shows a flow diagram of an incremental block level backup procedure in accordance with an illustrative implementation.

FIG. 3 shows a simplified flow diagram of an incremental block level backup procedure 300, in accordance with an embodiment. Additional, fewer, or different operations of the procedure 300 may be performed, depending on the particular embodiment. The procedure 300 can be implemented on a computing device. In one implementation, the procedure 300 is encoded on a computer-readable medium that contains instructions that, when executed by a computing device, cause the computing device to perform operations of the procedure 300. According to different embodiments, at least a portion of the various types of functions, operations, actions, and/or other features provided by the incremental block level backup procedure may be implemented at one or more nodes and/or volumes of the storage system. In an operation 302, metadata for a particular volume is retrieved (e.g., from a metadata server). For example, a backup sever may initiate a backup operation and retrieve initial metadata as described above. In an alternative embodiment, the backup server may be responding to a request to initiate a backup operation. For example, a client or backup software may submit a request via an API to perform a backup at a certain time. Alternatively, the backup server may be performing a backup according to a schedule (e.g., nightly backups, weekly backups, client-specified backups, etc.). In an operation 304, the initial backup of the data blocks of the volume is created. The metadata provides the block identifiers corresponding to the volume. The metadata may include an ordered list of block identifiers, a hash tree based on block identifiers, and other related data. The block identifiers are used to retrieve the corresponding data blocks to be backed up. For example, the backup server may analyze the metadata in order to request the transmission of and retrieve particular data blocks to be backed up. The request may be sent to the metadata server, which can facilitate the transmission of data from a block server. In an alternative embodiment, the backup server may retrieve the data blocks directly from the block server. The initial backup is a backup of all of the data of the volume as specified by the metadata. In an operation 306, the metadata used for the initial backup is stored for future use. In an operation 308, an incremental backup of the volume is initiated by retrieving the current metadata. For example, sometime after the creation of the initial backup, the backup server may retrieve updated metadata, which has been maintained by the metadata server to be current with the data blocks of the volume. As another example, metadata may be retrieved from a remote storage device. In an operation 310, the current metadata is compared to other metadata (e.g., the metadata from the immediately preceding backup operation, the metadata from the initial backup operation, the metadata from a remote device, etc.). For example, the backup server may analyze the metadata to determine changes in block identifiers as discussed above. Based on any changed block identifiers found during the analysis, in an operation 312, an incremental backup is created. For example, based on the identifiers of the changed data blocks, the backup server may retrieve only the changed data blocks to be backed up. The backup server may store received data blocks as described herein. In an operation 314, the metadata used for the incremental backup is stored for future use. The backup server may also generate additional metadata related to the backup procedure, including statistics to the amount of data backed up, the elapsed time of the backup process, etc. This process may repeat any number of times to create any number of incremental backups, as indicated by operation 316.

In another embodiment, the retrieval of the metadata and the comparison of the metadata to other metadata is performed by a device other than the backup server (e.g., by one or more devices of the storage system). For example, a storage device remote from the backup server may access metadata on the storage device, or may retrieve the metadata from another device, for example, from the metadata server. The storage device may analyze the metadata to determine changes in block identifiers as discussed above. Based on any changed block identifiers found during the analysis, an incremental backup can be created by transferring data to the backup server. For example, based on the identifiers of the changed data blocks, the storage device may transfer only the changed data blocks to the backup server to be backed up. The backup server may store received data blocks as described herein. The metadata used for the incremental backup can be stored by the storage device or can be transferred to another device (e.g., the metadata server) to be stored for future use.

Data Syncing in a Distributed System

In various embodiments, data can synced/replicated to another location. For example, data from a source system can be copied to a replica server. Data can be replicated locally, to another volume in its cluster, to another cluster, to a remote storage device, etc. Data that can be replicated includes, but is not limited to, block server data, metadata server data, etc. Replicated data is a representation of the data on the source system at a particular point in time. To reduce impact on the source system during replication, the replication process does not stop incoming I/O operations. To allow I/O operations to continue during a replication, writes that occur during the replication must be properly handled to avoid mismatches in data between the live data and the corresponding replicated data.

Figure 4:
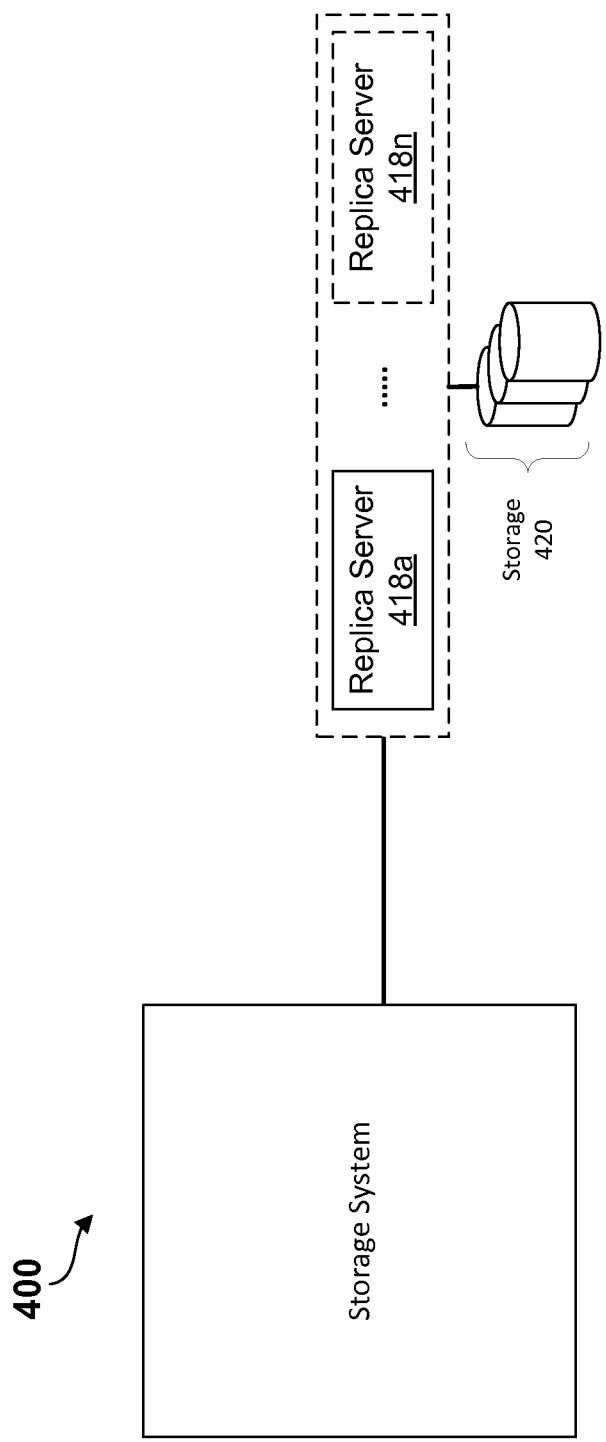
FIG. 4 depicts a distributed storage system in accordance with an illustrative implementation.

FIG. 4 depicts a distributed storage system 400 in accordance with an illustrative implementation. The storage system 400 stores live client data and may be configured as discussed above regarding system 100 (e.g., including client layer 102, metadata layer 104, block server layer 106, and storage). The storage system 400 can also include one or more replica servers 418a-418n. Replica servers 418a-418n can interface with the metadata and/or block servers of the storage system 400 in order to maintain synchronized (replicated) copies of data stored by the storage system 400. Replica servers 418a-418n are coupled to storage 420, which may store backups of volume data (e.g., backups of block level data of a client volume), synchronized data of client volume, snapshots of a client volume, and associated metadata. Storage 420 may include multiple hard disk drives (HDDs), solid state drives (SSDs), hybrid drives, or other storage drives. In one implementation, storage 420 can be a cluster of individual drives coupled together via a network. Replica servers 418 can store backup copies of the data blocks of storage system 400 according to any number of formats in storage 420, and translation from the format of the data blocks may occur.

In one embodiment, a replica server 418 maintains a live synchronized copy of data blocks of a client volume (e.g., a mirror copy of the client volume). To maintain synchronization, requests to write data that are provided by a client to storage system 400 may also be transmitted to the replica server 418. In this manner, data written to storage system 400 can be synchronized and stored on replica server 418 in real-time or semi real-time. Synchronization of volume data on replica server 418 includes synchronizing the metadata of storage system 400 that identifies blocks in a client volume. As discussed above, metadata servers of the storage system store metadata that includes a list of block identifiers that identifies blocks in a volume. The block identifiers may be hexadecimal numbers, and other representations may be used. Additional metadata may also be included (e.g., inode numbers, directory pointers, modification dates, file size, client addresses, list details, etc.). The block identifiers uniquely identify the data of a block and are a hash based on the content of the data block. In an embodiment, the metadata includes an ordered list structure of block identifiers. In another embodiment, the ordered list is structured as the leaves of a hash tree (e.g., a Merkle tree, etc.) and the metadata includes the hash tree. In an implementation utilizing a tree, when a write request is received and data is written to a block of a volume, values of the leaves (and inner nodes) of the tree change to corresponding to the changes of the block. Thus, replica server 418 can maintain a live synchronization tree that is updated to parallel the a tree maintained by a metadata server of storage system 400 for a particular client volume.

Figure 5:
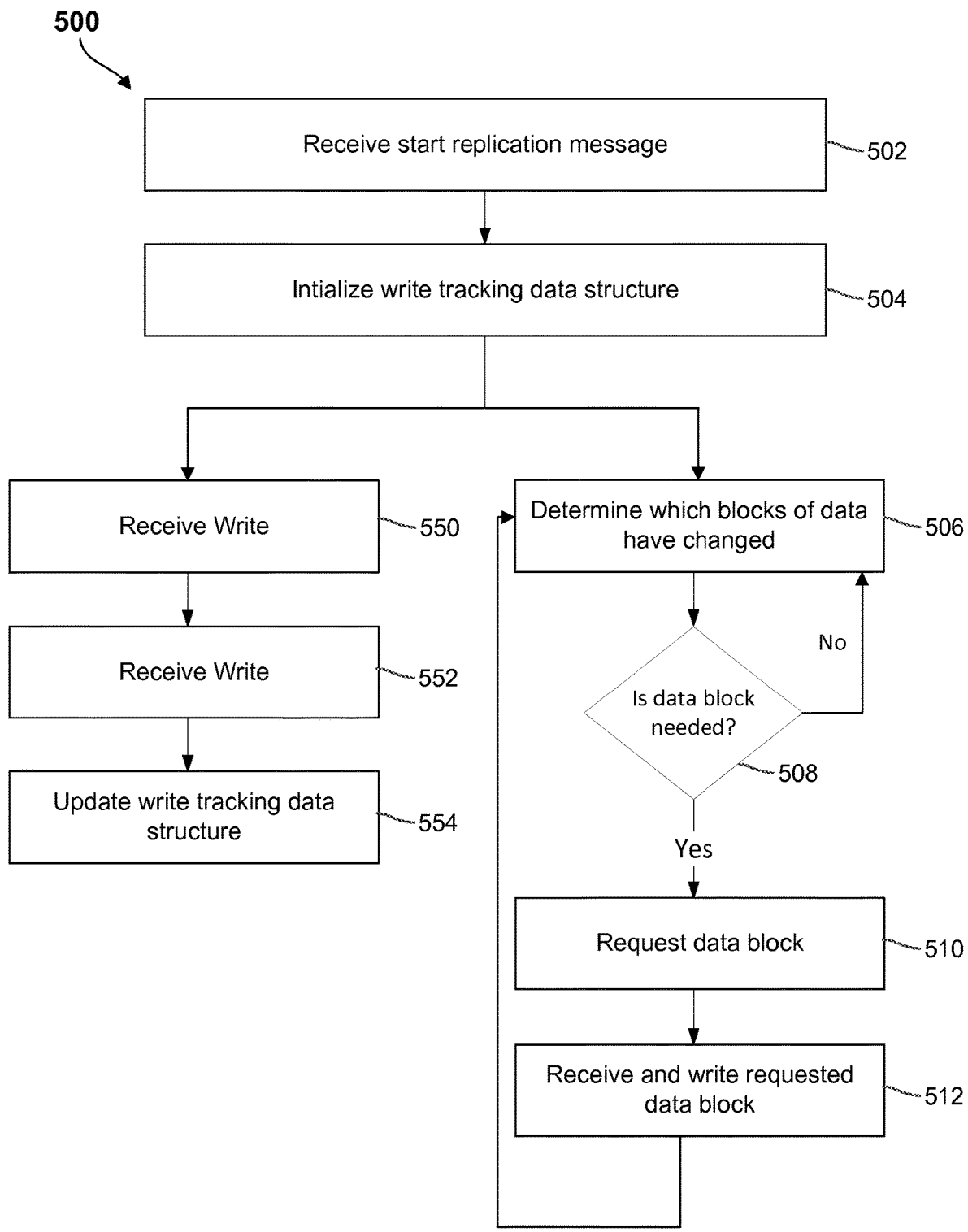
FIG. 5 shows a flow diagram for replicating data in accordance with an illustrative implementation.

FIG. 5 shows a flow diagram for replicating data in accordance with an illustrative implementation. Replication begins with a replica server receiving a start replication message from a source system (502). Upon receipt of the start replication message, the replica server initiates a data structure that will be used to track writes that occur during the replication process (504). In one embodiment, the data structure is a bit field where each bit represents a single unit of information, e.g., a block, a sub-block, etc. Each bit in the bit field represents if a particular unit has been written to after the start of the replication processes. In this embodiment, the bit field will be initialized to 0. At some point after sending the start replication message, the source system sends over replication data to the replica server. Similar to the block level backup embodiments, merkle trees can be used to minimize the amount of data that is required to be transferred between the source system and the replica server.

While the replication data is being sent to the replica server, data writes can be received at the source system. For example, a user may be writing new data to a file or metadata related to a user volume could be updated. The source system will handle the writes and while the replication process is active will also send the writes to the replica server. For example, the replica server can receive an I/O request to write a block of data (550). Upon receipt, the replica server can write the block of data (552) and will also update the bit associated with the block in the bit field to 1 (554). After the bit is set, the data write on the replica server is complete.

As part of the replication process, the replica server determines which blocks of data are needed from the source system (506). For example, a merkle tree comparison as described above can be used to determine blocks of data that have changed since a previous point-in-time image. One or more of the changed blocks of data, however, may have been changed again since the start of the replication process. Accordingly, the data will have already been sent to the replica server and requesting this data again is unneeded. Before requesting the block of data from source system, the bit field can be checked to determine if the block has already been received (508). If the block has not been updated, then the block of data is requested from the source system (510). The block is received (512) and written to storage. If the block has been updated, then no request for that block of data needs to be sent to the source system. This continues until there are no longer any data blocks that are needed from the source system. Once there are no longer any data blocks, the volume has been replicated. The replication system can send a message to the source system indicating that replication is complete. Upon receipt, the source system can stop forwarding I/O to the replication system.

In one embodiment, a block is the smallest amount of data that is written to storage in a single write operation. A block, however, can be divided into smaller sub-blocks, such that each unit of a block can be written to separately. As an example, a block can be 4 kilobytes in size and broken down into sixteen 256 byte sub-blocks. In this embodiment, the data structure corresponds to the sub-blocks and not the blocks. While replication is being done, a write to a sub-block can be received. The write command can include the data for the entire block or just the sub-block of data. The write can update a cache that is associated with the sub-block or could write the sub-block to storage. When only a sub-block is received in the write request, the block that contains the sub-block is retrieved and the sub-block is updated appropriately. Later during replication, the Merkle tree comparison can be used to determine that the block with the updated sub-block needs to be retrieved from the source system. For example, another sub-block may have been update from the previous replication. The entire block can be retrieved. The corresponding block on the replica server is retrieved and updated. To update the corresponding block on the replica server, the data structure is used to update each sub-block from the block retrieved from the source system. For sub-blocks where the data structure indicates that the sub-block has been updated during the replication process, the sub-block is not updated since it already has the latest data. If the data structure indicates that a sub-block has not been updated, that sub-block is updated with the corresponding sub-block received from the source system. To reduce unnecessary data transfers, before the replica server requests a block, the replica server can determine if all the sub-blocks of a block have been updated during the replica process. In this case, the replica server has already replicated this block and there is no need to request that block of data from the source system.

As described above, replica servers 418a-418n can be configured to create point-in-time images of components of the data of storage system 400. In one embodiment, each point-in-time image includes corresponding metadata (e.g., a hash tree) that identifies the blocks of the point-in-time image. The hash tree of a point-in-time image is based on the block identifiers of the data stored for the point-in-time image. A replica server 418 may create one or more point-in-time images of a component of the data of storage system 400, and each point-in-time image may be created according a defined schedule, or on demand (e.g., in response to a client demand, or as demanded by an administrator of storage system 400, etc.). The source system may also create various copies/replicas of a volume locally. For example, every day a replica of a volume can be scheduled. A remote replication system may only replicate a subset of the replicas that are local to the source system. For example, a remote replication system can request a single local copy every week rather than each of the daily local replicas. In another embodiment, the remote replication system can make a replica of the current live volume and ignore any other local replicas of the volume.

In the instance that a replica server 418 goes offline (e.g., due to a failure, being manually taken offline, or otherwise), the replica server 418 may be brought back online and resume synchronizing volume data with storage system 400. However, due to the period of time that the replica server 418 was offline, the data of replica server 418 may be out of sync with the volume data of storage system 400. Accordingly, replica server 418 may retrieve the data that is needed from storage system 400 to re-synchronize with the live volume data of storage system 400. In one embodiment, replica server 418 may implement one or more techniques of the block level incremental backup process to synchronize the volume data. For example, replica server 418 can retrieve the metadata for a live volume (e.g., a tree corresponding to the live volume as maintained by a metadata server). Replica server 418 may then analyze versions of metadata (e.g., comparing the out-of-date synchronization tree of replica server 418 and the retrieved live volume tree). Based on this analysis, replica server 418 can determine changed data blocks of the volume and what blocks needs to be retrieved from storage system 400 to synchronize the volume data. The replica server 418 may request any changed data blocks from storage system 400 and the retrieved blocks may be stored. As replica server 418 is synchronizing its volume data, write requests may still be received and the point-in-time image can still be created. In the instance that a new point-in-time image is being created and the volume data of replica server 418 is not fully synchronized with the live volume data of storage system 400, a data block may not yet be available in the data of replica server 418 to be stored in the new point-in-time image. For example, referring to the new point-in-time image creation process discussed above, the comparison of the metadata of the new tree with the metadata of the live tree may indicate that a block identifier (and therefore block data) has changed. However, the changed block may not yet be synchronized in the volume data of replica server 418. In this scenario, replica server 418 may retrieve the changed block data directly from the storage system 400 (as opposed to pointing to or retrieving the changed block data from the synchronized volume data of replica server 418 as discussed above).

After replication of a volume has completed, the replication can be verified. In one embodiment, this is done by the source system sending to the replica system one or more merkle tree nodes. The replica system can then compare the received merkle tree nodes with the corresponding merkle tree nodes of the replicated copy of the source volume. If any corresponding nodes do not match, the data was not properly replicated between the source system and the replica system. In this embodiment, the merkle tree on the replica side is updated as blocks of data are written to cached data structures and/or storage. Accordingly, the merkle tree is being updated on the replica system in a similar way as the merkle tree was updated on the source side. In one embodiment, the top level node of the merkle tree is compared. In other embodiments, the top two, three, etc., layers of the merkle tree are compared. For this comparison to work properly, the source side and the replica side must be in sync in regard to any data that is to be written. For example, if data is written on the source side, the replica side must also handle that write prior to the verification step. In one embodiment, this is accomplished through messaging between the source and replica systems. Once the replication is complete, the replica server can send a message requesting verification data. The source system can pause handling write requests until the verification data, e.g., the merkle tree nodes, are sent to the replica side. The replica side receiving the verification data handles any queued write requests prior to comparing the received verification data with local data. Once verification is done, the replica system can send a message and the I/O can continue. In another embodiment, the replica side can queue any received I/O requests from the source side. This allows the source side to begin handling I/O as soon as the verification data has been sent to the replica system. Once the verification is done, the replica system can handle any queued I/O requests. Verification can be done at any point during the replication process. The only requirement is that the source and replica side be in sync in regard to handling write requests. For example, after a certain number of blocks have been replicated or after a predetermined amount of time has passed, the replica server can request verification data from the source system.

Replication data between different systems can impact the performance of both systems. Quality of service can be implemented on both the source system and the replica system to ensure adequate service is provided based upon quality of service provisions. Embodiments of quality of service provisions that can be used in replication are described in U.S. application Ser. No. 13/856,958, which is incorporated by reference in its entirety. The quality of service allocated for I/O for a particular volume can be different on the source system compared to the replica system. For example, the replica system may have allocated 1,000 input output per second (IOPs), while the source system has allocated 5,000 IOPs for a particular volume. In this situation, the source system could overload the replica system's ability to handle the IOPs associated with replicating the volume from the source system to the replica system. Once the IOPs threshold has been reached on the replica system, the handling of I/O can be paused. A timer can be used to monitor how long I/O has been paused. If the timer exceeds some threshold, the replication of the source volume can be stopped and reported.

To reduce replications from being stopped, volumes that are to be replicated can be sorted based upon quality of service (QoS) parameters associated with the volumes. In one embodiment, sorting is done on the sum of QoS parameters from the source system and the replica system. This sum can represent a relative importance of a volume, with higher QoS parameters being more important than lower level QoS parameter volumes. In another embodiment, the ratio of the replica QoS parameter to the source QoS parameter is used to sort the volumes. Volumes with higher ratios indicate that the replication of those volumes are likely to successfully finish. Volumes whose ratios fall below a threshold amount can be flagged as volumes whose replication may not successfully finish due to QoS provisions. For example, if the ratio is less than one, the source side's QoS provisions could force the replica side to throttle I/O to the point that the replica side terminates the replication as described above. In another embodiment, the volumes can be sorted based upon the replica system's QoS parameter only. This allows volumes to be given high replication priority by increasing the QoS provisions of the volume on the replica server, without having to modify the source side's QoS provisions. Accordingly, a replication of a volume can be assured to successfully complete based upon a high QoS parameter on the replica side. In another embodiment, the volumes can be sorted based upon the source system's QoS parameter only. Once the volumes have been sorted, replication can begin in an ordered fashion based upon the sorting. Warnings can be generated for any volume that is below some threshold, e.g., ratio below a threshold, sum is below a threshold, etc. The warnings can provide information regarding the replication and the QoS parameters, such that the QoS parameters can be modified to remove future warnings.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

What is claimed is:

1. A server comprising:
one or more processors;
a network interface; and
a computer-readable medium having program instructions executable by the one or more processors to cause the server to,
based on a start replication message to replicate data of a source volume to a replicated volume associated with the server,
initiate a data structure to track writes to the replicated volume based on client write requests forwarded from a distributed storage system,
retrieve from the distributed storage system source metadata that indicate content of data blocks of the source volume at a first point-in-time;
compare the source metadata with prior metadata to determine changes in the content of the data blocks of the source volume between the first point-in-time and a second point-in-time, wherein the prior metadata indicate content of the data blocks of the source volume at the second point-in-time which is prior to the first point-in-time;
based on receipt of a client request, forwarded from the distributed storage system, to write data to the source volume during replication,
write to one or more data blocks of the replicated volume data of the client request;
update the data structure to indicate the write to the one or more data blocks of the replicated volume;
for each data block of the source volume determined to have changed based upon comparison of the source metadata and the prior metadata, determine with the data structure whether a corresponding data block in the replicated volume was written to during the replication; and
request, for update of the replicated volume, retrieval from the distributed storage system of those data blocks of the source volume determined to have changed based upon the comparison of the source metadata with the prior metadata but not indicated in the data structure as having been written to in the replicated volume during the replication.

2. The server of claim 1, wherein the computer-readable medium further comprises program instructions executable by the one or more processors to cause the server to send a replication complete message to the distributed storage system to terminate forwarding of client requests to the server.

3. The server of claim 1, wherein the computer-readable medium further comprises program instructions executable by the one or more processors to cause the server to:
request verification metadata from the distributed storage system, wherein the verification metadata indicate content of the source volume after the replication and indicate writes to the source volume based on the client requests during the replication;
update the prior metadata to indicate writes to the replicated volume during the replication including the writes indicated in the data structure; and
verify the replication based on comparison of the verification metadata with the updated prior metadata.

4. The server of claim 1, wherein the computer-readable medium further comprises program instructions executable by the one or more processors to cause the server to:
request a quality of service parameter for the replicated volume;

request a quality of service parameter for the source volume; and determine if the replication of the source volume to the replicated volume will succeed based upon the quality of service parameter of the replicated volume and of the source volume.

5. The server of claim 4, wherein the program instructions to determine if the replication of the source volume to the replicated volume will succeed based upon the quality of service parameter of the replicated volume and of the source volume further comprises program instructions to determine a ratio of the quality of service parameter for the replicated volume to the quality of service parameter for the source volume, and to determine that the replication of the source volume will succeed if the ratio is greater than one.

6. The server of claim 1, wherein the data blocks of the replicated volume are randomly and evenly distributed across a cluster containing the replicated volume.

7. A method comprising:
based on a start replication message to replicate data of a source volume to a replicated volume associated with a replica server,
    initiating a data structure to track writes to the replicated volume based on client write requests forwarded to the replica server from a distributed storage system;
retrieving from the distributed storage system source metadata that indicate content of data blocks of the source volume at a first point-in-time;
comparing the source metadata with prior metadata to determine changes in the content of the data blocks of the source volume between the first point-in-time and a second point-in-time, wherein the prior metadata indicate content of the data blocks of the source volume at the point-in-time which is prior to the first point-in-time;
based on receipt of a first client request, forwarded from the distributed storage system, to write data to the source volume during replication,
    writing data of the first client request to one or more data blocks of the replicated volume;
    updating the data structure to indicate the write to the one or more data blocks of the replicated volume;
for each data block of the source volume determined to have changed based upon the comparison of the source metadata and the prior metadata, determining with the data structure whether a corresponding data block in the replicated volume has been written during the replication; and
requesting, for update of the replicated volume, retrieval from the distributed storage system of those data blocks of the source volume determined to have changed based upon the comparison of the source metadata and the prior metadata but not indicated in the data structure as having been written in the replicated volume during the replication.

8. The method of claim 7, further comprising sending a replication complete message to the distributed storage system to terminate forwarding of the client requests to the replica server corresponding to completion of the replication.

9. The method of claim 7, further comprising:
requesting verification metadata from the distributed storage system, wherein the verification metadata indicate content of the source volume after the replication and indicate writes to the source volume based on the client requests during the replication;
updating the prior metadata to indicate the writes to the replicated volume during the replication including the writes indicated in the data structure; and
verifying the replication based on a comparison of the verification metadata with the updated prior metadata to determine that the replication was successful.

10. The method of claim 7, further comprising:
requesting a quality of service parameter for the replicated volume;
requesting a quality of service parameter for the source volume; and
determining if the replication of the source volume to the replicated volume will succeed based upon the quality of service parameter of the replicated volume and of the source volume.

11. The method of claim 10, wherein determining if the replication of the source volume to the replicated volume will succeed based upon the quality of service parameter of the replicated volume and of the source volume comprises determining a ratio of the quality of service parameter for the replicated volume to the quality of service parameter for the source volume, and determining the replication of the source volume will succeed if the ratio is greater than one.

12. The method of claim 7, wherein the data blocks of the replicated volume are randomly and evenly distributed across a cluster containing the replicated volume.

13. A non-transitory computer-readable medium comprising instructions for replicating a live source volume, the instructions executable to cause a machine to:
based on a start replication message to replicate data of a source volume to a replicated volume associated with a replica server, initiate a data structure to track writes to the replicated volume based on client requests forwarded to the replica server from a distributed storage system;
retrieve source metadata from the distributed storage system, wherein the source metadata indicate content of data blocks of the source volume at a first point-in-time;
compare the source metadata with prior metadata to determine changes in the content of the data blocks of the source volume between the first point-in-time and a second point-in-time, wherein the prior metadata indicate content of the data blocks of the source volume at the second point-in-time which is prior to the first point-in-time;
based on receipt of a first client request, forwarded from the distributed storage system, to write data to the source volume during replication,
    write to one or more data blocks of the replicated volume the data of the first client request;
    update the data structure to indicate the write to the one or more data blocks of the replicated volume;
for each data block of the source volume determined to have changed based upon the comparison of the source metadata and the prior metadata, determine with the data structure whether a corresponding data block of the replicated volume was written to during the replication; and
request, for update of the replicated volume, retrieval from the distributed storage system of those data blocks of the source volume determined to have changed based upon the comparison of the source metadata with the prior metadata but not indicated in the data structure as having been written to in the replicated volume during the replication.

14. The non-transitory computer-readable medium of claim 13 further comprising instructions executable to cause the machine to send a replication complete message to the distributed storage system to terminate forwarding of the client requests to the replica server corresponding to completion of the replication.

15. The non-transitory computer-readable medium of claim 13 further comprising instructions executable to cause the machine to:
request verification metadata from the distributed storage system, wherein the verification metadata indicate content of the source volume after the replication and indicate writes to the source volume based on the client requests during the replication;
update the prior metadata to indicate writes to the replicated volume during replication including writes indicated in the data structure; and
verify the replication based on comparison of the verification metadata with the updated prior metadata.

16. The non-transitory computer-readable medium of claim 13 further comprising instructions executable to cause the machine to:
request quality of service parameters for the replicated volume;
request quality of service parameters for the source volume; and
determine if the replication of the source volume to the replicated volume will succeed based upon the quality of service parameters of the replicated volume and the source volume.

17. The non-transitory computer-readable medium of claim 13, wherein the data blocks of the replicated volume are randomly and evenly distributed across a cluster containing the replicated volume.

\* \* \* \* \*